(12) United States Patent
Stace

(10) Patent No.: US 6,266,950 B1
(45) Date of Patent: Jul. 31, 2001

(54) ROTARY LAWN MOWERS

(75) Inventor: Martin Stace, Stowmarket (GB)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/379,464

(22) Filed: Aug. 24, 1999

(30) Foreign Application Priority Data

Aug. 28, 1998 (GB) .................................................. 9818882

(51) Int. Cl.$^7$ .................................................. A01D 53/00
(52) U.S. Cl. .......................................................... 56/12.8
(58) Field of Search ................................ 56/12.7, 12.8, 56/13.1–13.4, 136, 16.7, 16.9, 17.1, DIG. 10; 15/300.1–306.1, 312.1, 312.2

(56) References Cited

U.S. PATENT DOCUMENTS

| 3,170,276 | * | 2/1965 | Hall ........................................ 56/12.8 |
| 3,465,505 |   | 9/1969 | Krinke . |
| 4,245,456 | * | 1/1981 | Zipfel ..................................... 56/12.8 |
| 4,361,001 | * | 11/1982 | Almond et al. ........................ 56/12.8 |
| 4,510,738 | * | 4/1985 | Dunn ...................................... 56/12.8 |
| 5,205,113 | * | 4/1993 | Fassauer ................................. 56/12.8 |
| 6,047,530 | * | 4/2000 | Bednar ............................... 56/13.6 X |

FOREIGN PATENT DOCUMENTS

| 19531128 | 2/1996 | (DE) . |
| 0 477 629 | 11/1994 | (EP) . |
| 2292663 | 3/1996 | (GB) . |

* cited by examiner

Primary Examiner—Robert E. Pezzuto
(74) Attorney, Agent, or Firm—Venable; John P. Shannon; Chad Anderson (57) ABSTRACT

A hovermower is comprises a motor for driving a cutter about a substantially vertical axis beneath a protective deck, a mechanism generating a cushion of pressurized air beneath the deck, and a handle for maneuvering the deck over the ground, the deck being pivotable relative to the handle about a first substantially horizontal axis, characterised in that the deck is further pivotable relative to the handle about a second horizontal axis transverse to the first axis.

23 Claims, 10 Drawing Sheets

ROTARY LAWN MOWERS

BACKGROUND OF THE INVENTION

This invention relates to a rotary lawn mower, particularly one of the type that floats on a cushion of air and which is generally known as a hovermower.

A conventional hovermower works most effectively on flat ground. When used on a rough or undulating terrain, there is a significant loss in performance and the mower becomes difficult to maneuver as the user attempts to follow the contours of the ground.

A walk-behind rotary lawn mower generally includes a motor for driving a cutter about a substantially vertical axis beneath a protective deck, and a handle for maneuvering the deck over the ground. The motor, deck and cutter have a fixed relationship but, in a hovermower, the handle is generally free to pivot backwards and forwards relative to the deck about a transverse horizontal axis.

SUMMARY OF THE INVENTION

According to the present invention there is provided a hovermower comprising a motor for driving a cutter about a substantially vertical axis beneath a protective deck, means for generating a cushion of pressurised air beneath the deck, and a handle for maneuvering the deck over the ground, the deck being pivotable relative to the handle about a first substantially horizontal axis characterised in that the deck is further pivotable relative to the handle about a second horizontal axis transverse to the first axis.

Preferably, the deck is freely pivotable about both the first and second axes so that it is able to follow the contours of the ground over which the deck is passing without the user having to apply any tilting effort through the handle. However, in some cases the pivotal movement may be achieved against a resilient bias. Moreover, the handle can be pivoted by the user from side to side as well as backwards and forwards without tilting the deck, and this significantly improves the maneuverability of the mower, particularly when mowing around obstacles such as trees and bushes. With a conventional hovermower, sideways movement is more awkward and generally involves straining the user's back muscles.

In one embodiment the handle is pivoted on a member bounding the motor, and the bounding member is pivotally connected to the deck. The bounding member preferably comprises a cover shrouding the motor. In this embodiment the handle preferably comprises a forked or pram handle having two fores pivotally connected to first diametrically opposed sections of the member bounding the motor for pivotal movement about the first horizontal axis, and the deck is pivotally connected to second diametrically opposed sections of the bounding member for pivotal movement about the second horizontal axis, the first and second diametrically opposed sections being mutually perpendicular to one another.

In a second embodiment the handle is pivoted on the deck for rotation back and forth about the first horizontal axis, and the handle includes a resilient link so arranged that the portion of the handle grasped by the user can pivot from side to side relative to the portion of the handle pivoted on the deck.

In a third embodiment the handle is connected to the deck through a ball joint, the handle being constrained by a first guide member for pivotal movement about one of the two transverse axes, and the guide member being constrained for pivotal movement about the other of the two axes.

DESCRIPTION OF THE DRAWINGS

An example of each of these embodiments of the invention will now be described with reference to the accompanying drawings in which.

DESCRIPTION OF THE PREFERRED EMBODIMENT

Figure 4:
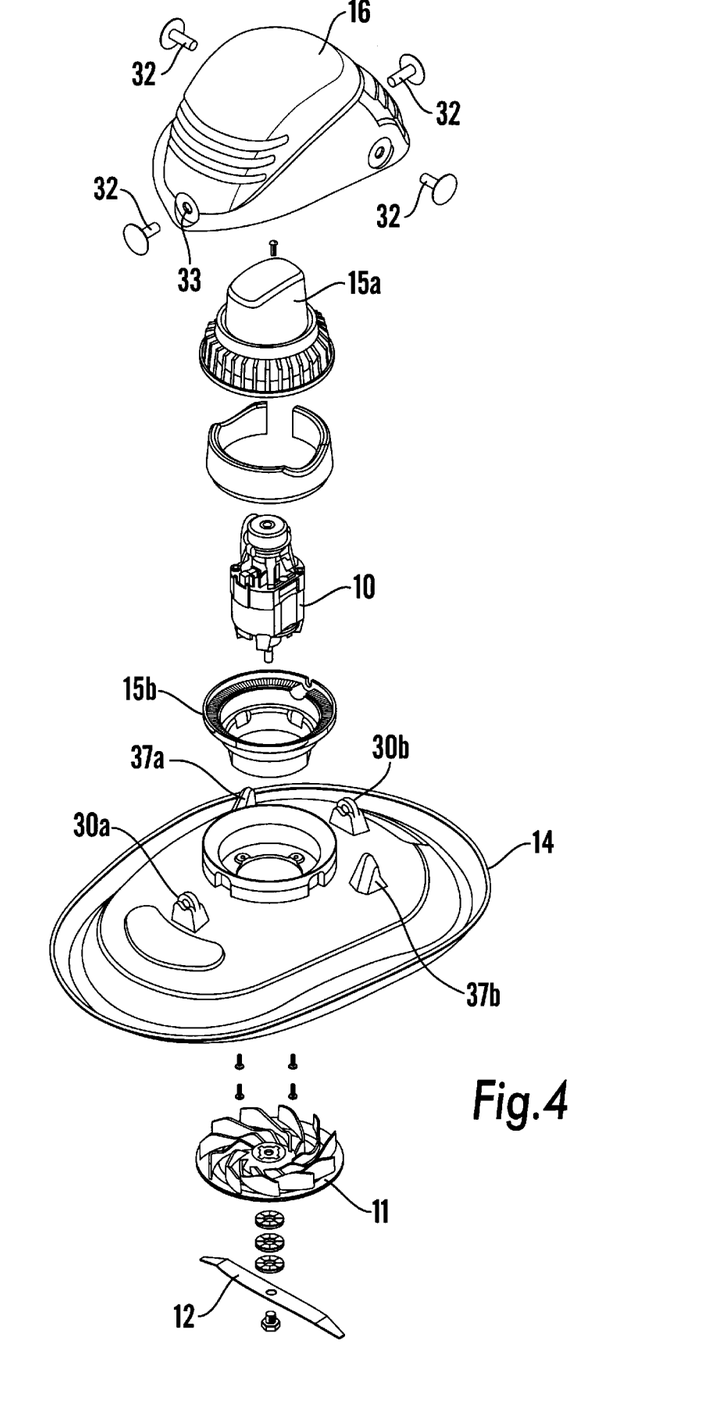
FIG. 4 is an exploded view showing the main components of the mower.

Referring first to FIGS. 1–7, the illustrated hovermower has a motor 10 driving a fan 11 and a cutter blade 12 about a vertical axis. The fan and the blade rotate beneath a protective deck 14 and the motor is enclosed within an air filter housing 15 having a top part 15a and a bottom part 15b (FIG. 4).

The motor housing 15 is shrouded by a cover 16, and the deck 14 is pivotally connected to the cover at front and rear pivots 30a, 30b so that the deck is free to pivot relative to the cover about a first horizontal axis. A pram handle 17 is also pivotally connected to the cover 16 at opposed pivots 31a, 31b so that the handle is free to pivot backwards and forwards about a second horizontal axis perpendicular to the first axis when manoeuvring the deck 14 over the ground.

The pivotal connection of the handle 17 to the cover 16 allows the deck 14 to pivot backwards and forwards relative to the handle while allowing the user to maintain the handle at a comfortable height when moving in a forward or backward direction. At the same time, the pivotal connection of the deck 14 to the cover 16 allows the deck to tilt from side to side relative to the handle so that the combination of the pivotal connection between the handle and the cover and the pivotal connection between the cover and deck about mutually perpendicular axe ensures that the deck is free to follow the contours of the ground without the user having to apply any effort through the handle. This not only improves the performance of the mower but is less tiring to use, particularly over rough or undulating terrain. If the deck meets a gradient when moved forward, backward or to one side, it will automatically tilt so that it lies generally parallel to the gradient without the user having to tilt the handle. This applies regardless of whether the gradient is upwards or downwards. The deck therefore appears to the user as if it is floating over the ground.

Figure 5:
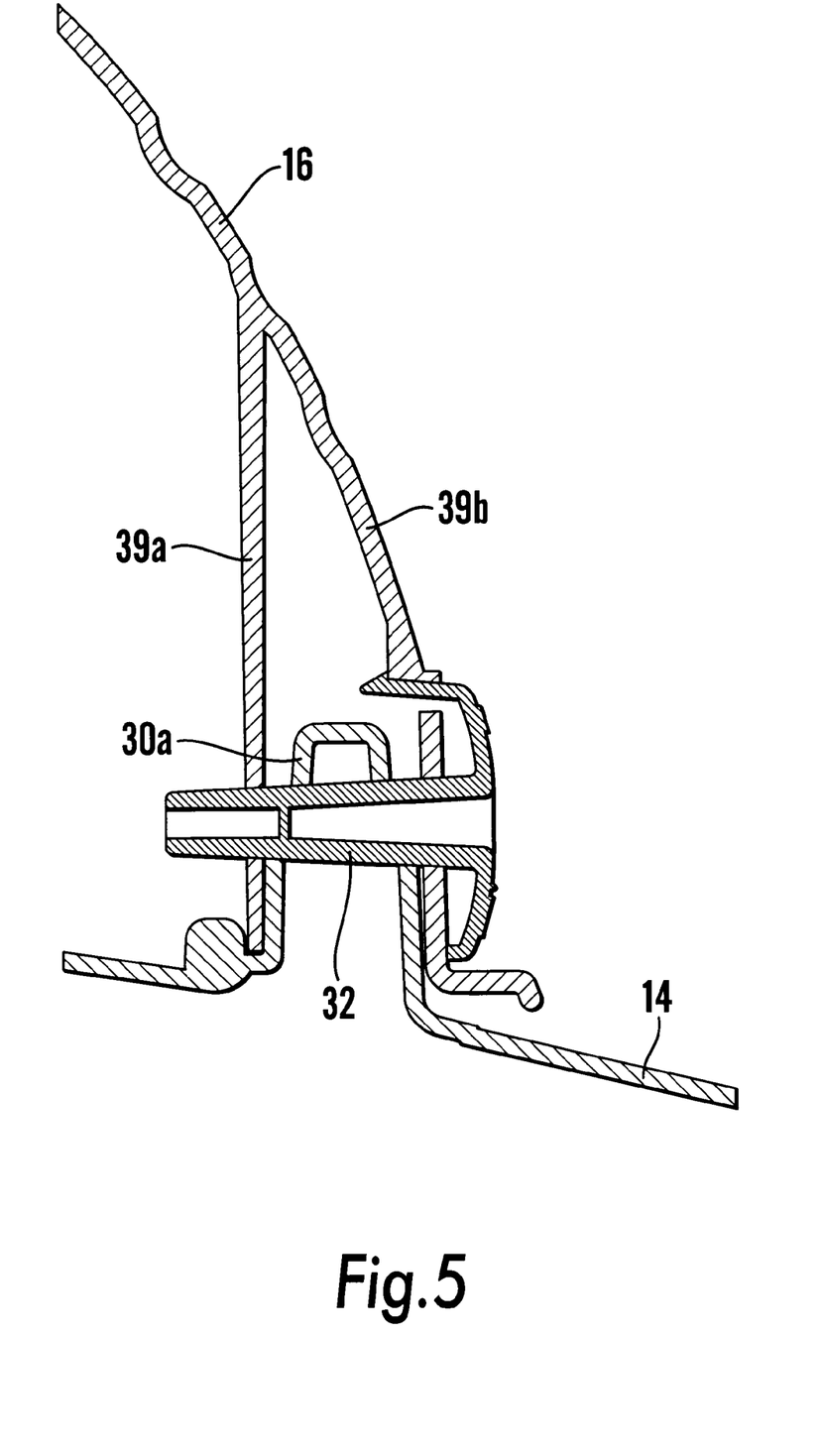
FIG. 5 is a sectional view illustrating the pivotal mounting of the cover on the deck.
Figure 6:
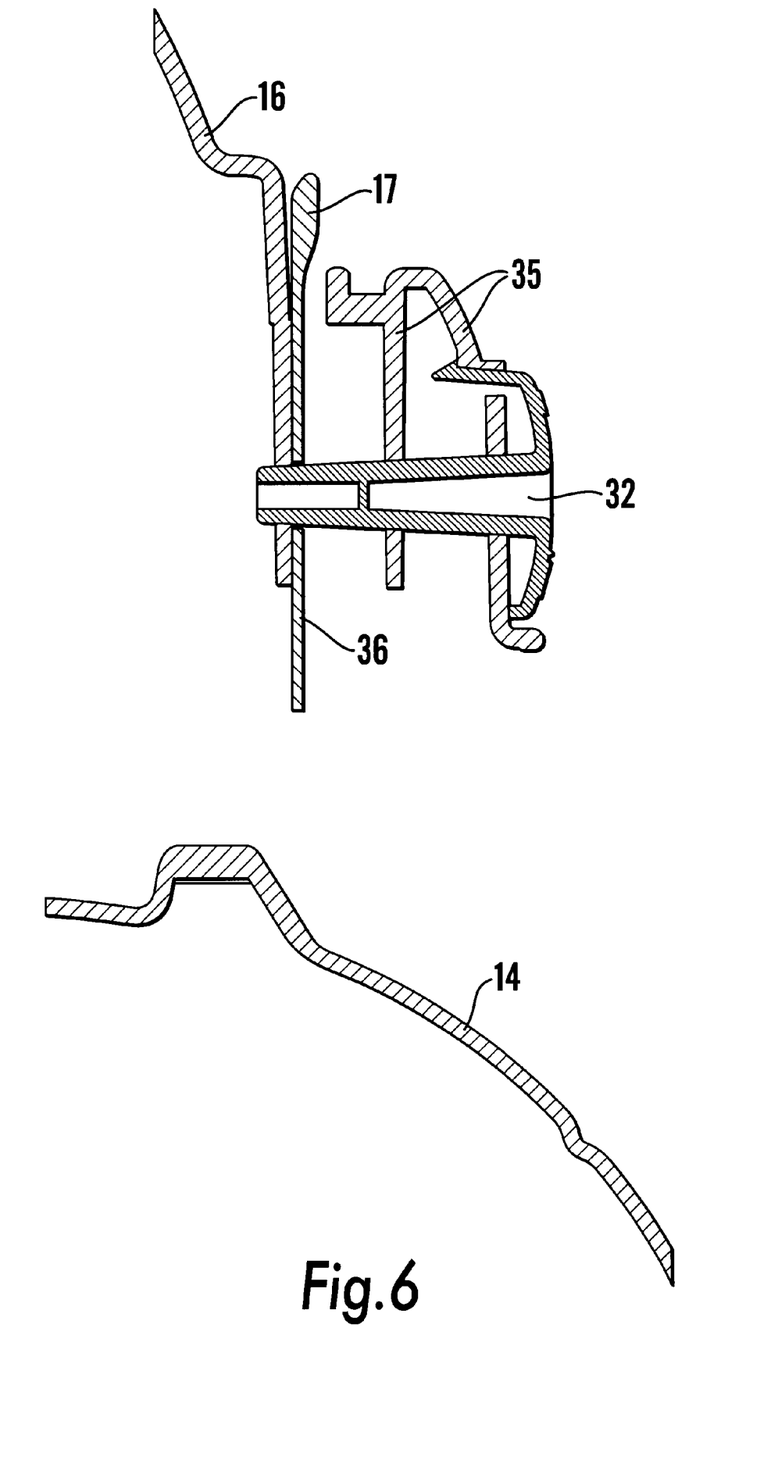
FIG. 6 is a sectional view illustrating the pivotal mounting of the handle on the motor housing.

Referring particularly to FIGS. 4–6, the pivotal connections between the handle 17 and the cover 16, and between the cover 16 and the deck 14, are illustrated. The deck 14 includes a pair of mountings 30a, 30b which are inserted between inner and outer walls 31a, 31b of the cover 16 and which each include openings for receiving respective pivot pins 32 when aligned with corresponding openings 33 in the inner and outer walls of the cover. The deck 14 is therefore free to pivot relative to the cover 16 about a horizontal axis passing through the mountings 30a, 30b and therefore extending from the front to the back of the mower.

At the same time, the cover 16 includes a pair of openings 34a, 34b located toward the rear which receive the respective forks of the pram handle 17, the end portions 36 of the forks being flattened and including circular openings for receiving respective pivot pins 32 when aligned with corresponding openings in a double-walled flange portion 35 of the cover 16.

The cover 16 is therefore free to pivot about a horizontal axis passing through the flattened end portions 36 of the forked handle 17, and any pivotal movement of the cover 16 will be transmitted to the deck 14 through the connections between the cover and the deck.

Figure 1:
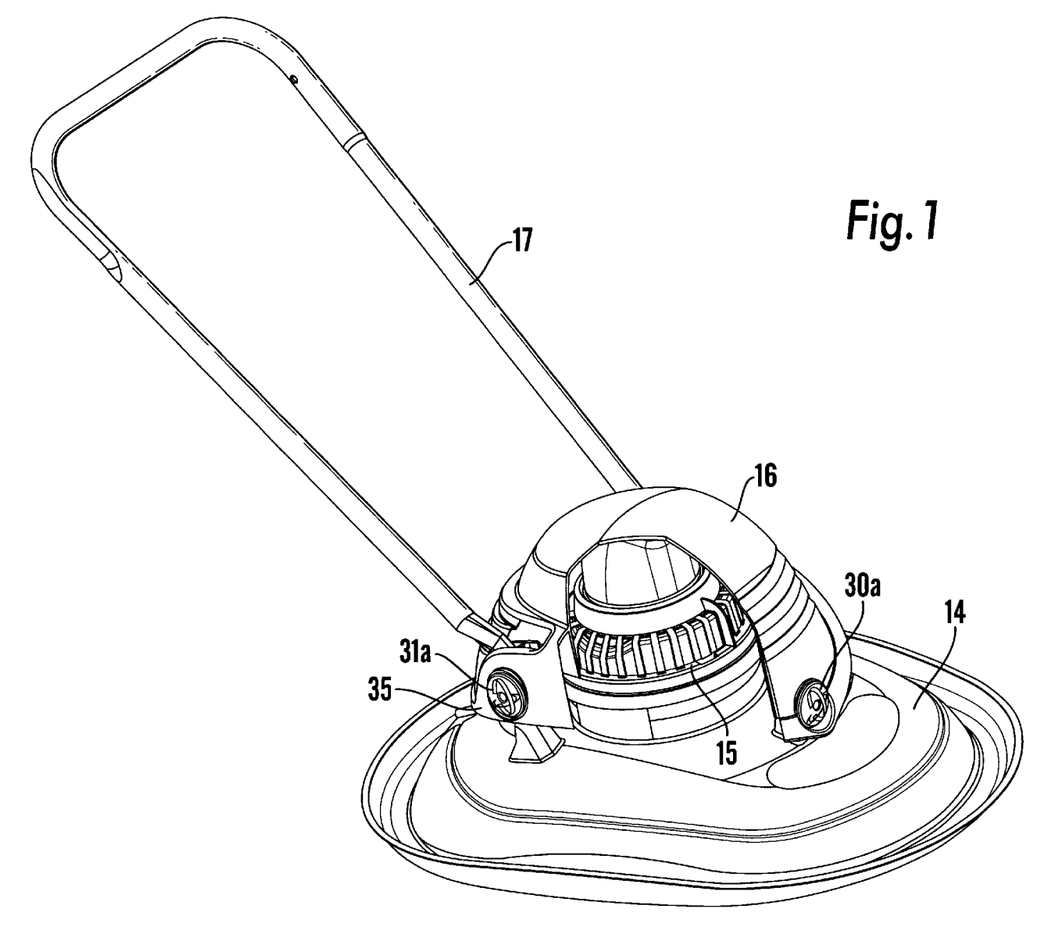
FIG. 1 is a view of a first hovermower embodying the invention with its handle in an operating position.
Figure 2:
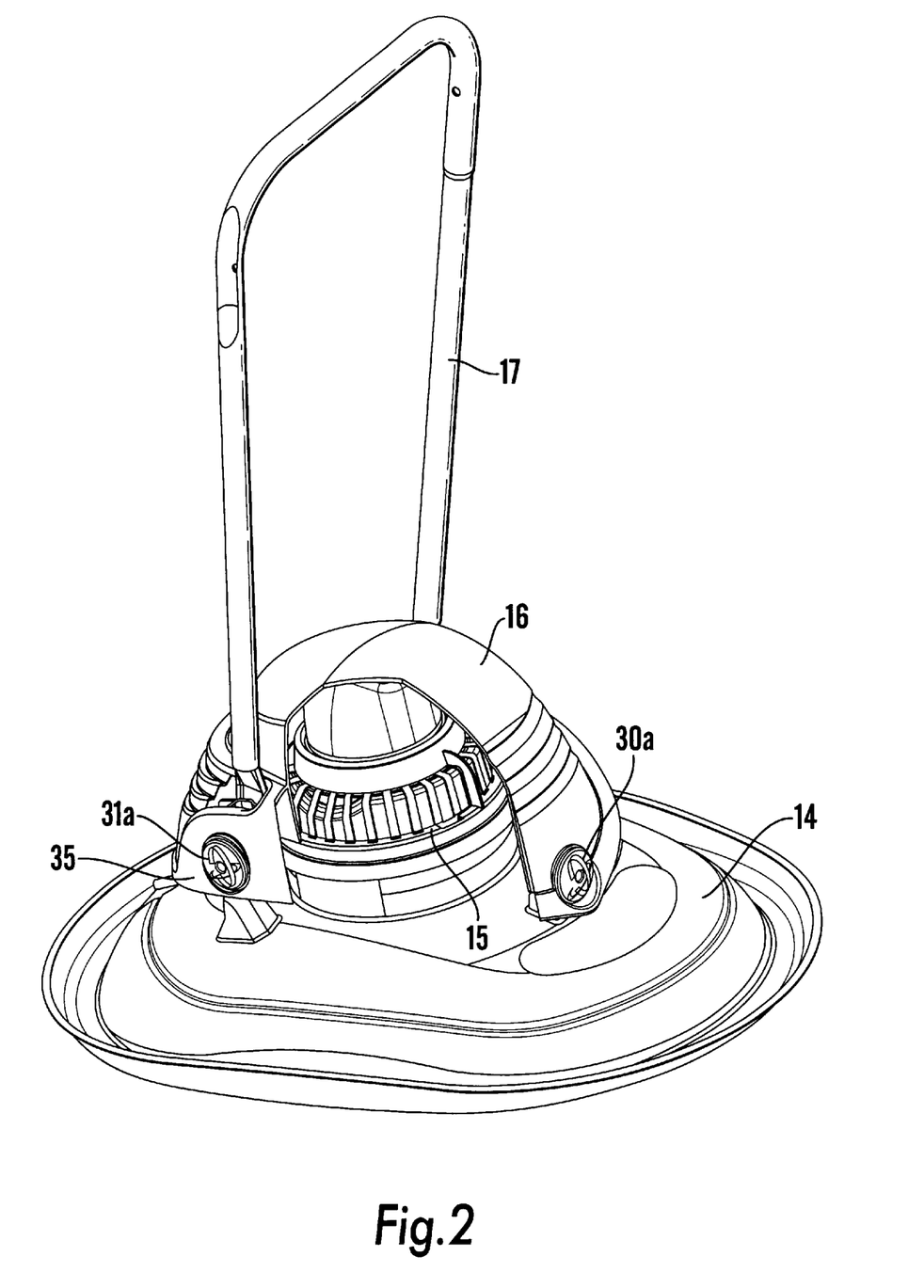
FIG. 2 is a similar view of the mower of FIG. 1 with its handle in a parked position.
Figure 3:
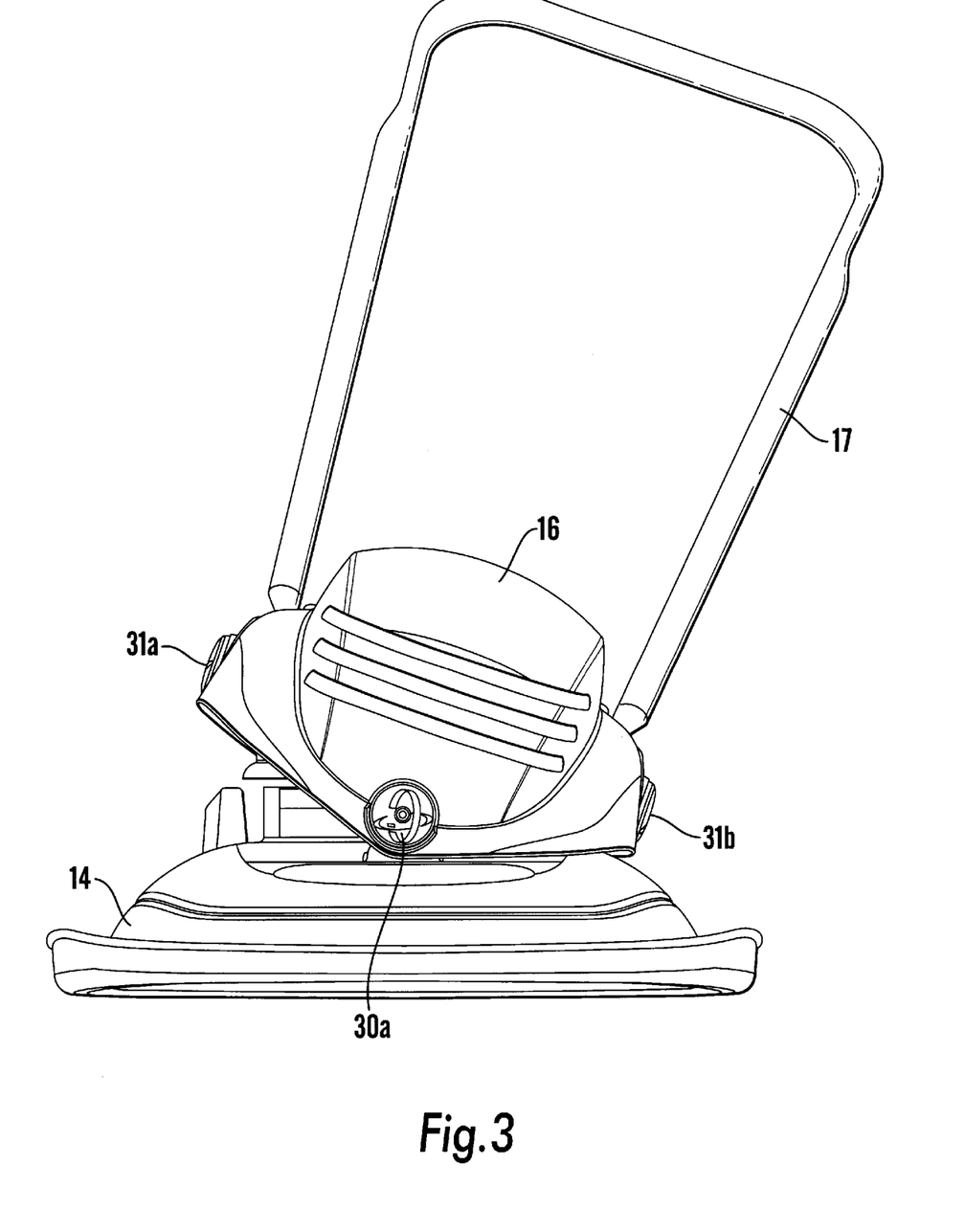
FIG. 3 is a similar view of the mower of FIG. 1 with the cover tilted relative to the deck.

The handle 17 can be moved from its inclined operating position (FIG. 1) into an upright parked position as shown in FIG. 2. A detent arrangement may retain the handle in its parked position in a known manner. In addition, a mechanism is provided to prevent the cover from pivoting sideways relative to the deck 14 when the handle is retained in the parked position. This mechanism is illustrated in FIGS. 4 and 7 and consists of a pair of projections 37a, 37b on the deck 14 which engage the bottom surface 38 of the flattened end portions 36 of the handle 17 when the handle is in its upright position but which lie clear of the bottom surface 38 when the handle is in its operating position.

Figure 7:
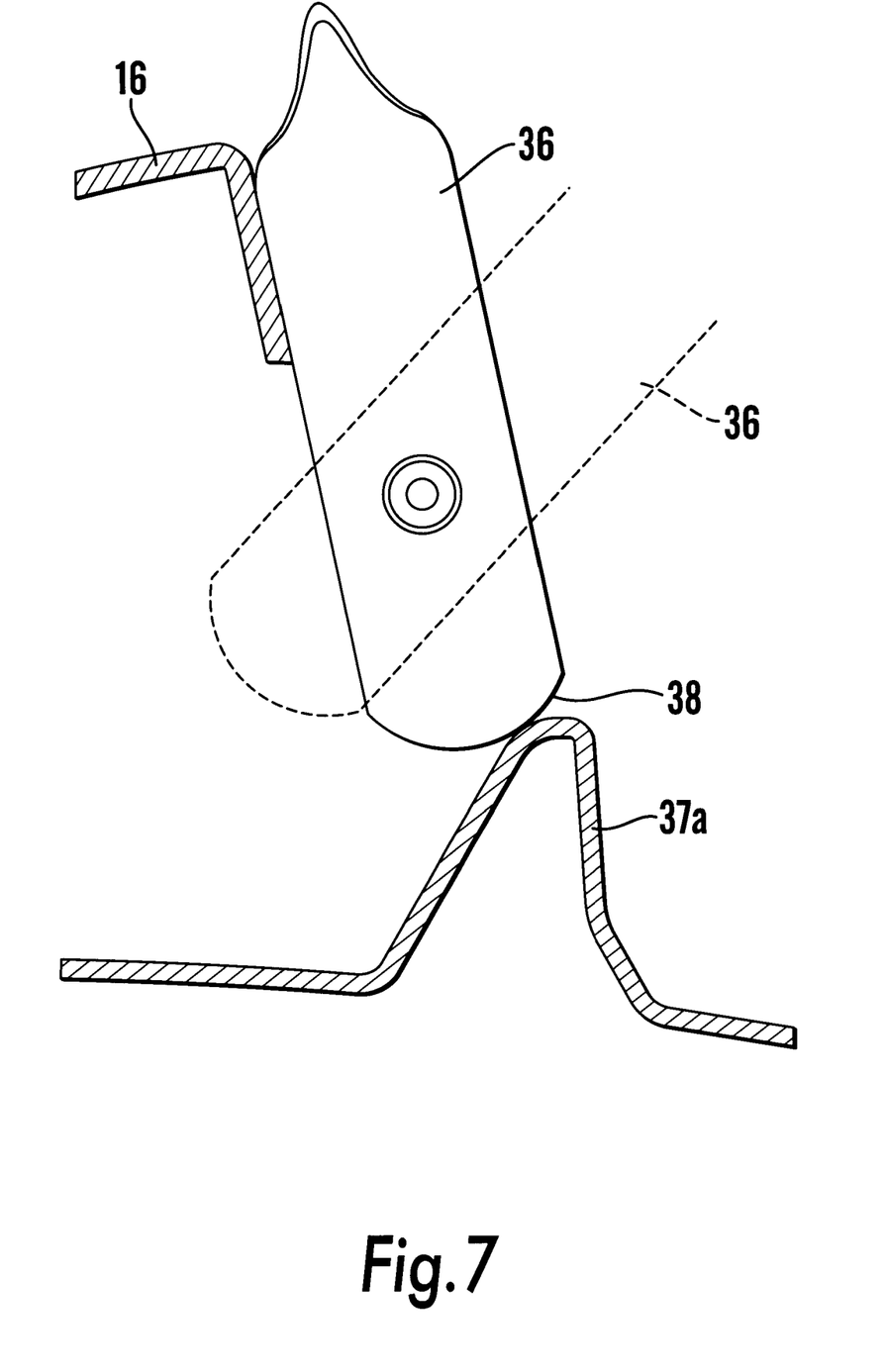
FIG. 7 is a detail illustrating a mechanism for preventing sideways movement of the handle when the handle is retained in an upright parked position.

Thus, in the drawing of FIG. 7 further downward movement of the flattened end portion 36 of the handle which would occur if the cover 16 was tilted about the horizontal axis passing through the mountings 30a, 30b (FIG. 4) is prevented by the projection 37a engaging the surface 38.

As illustrated, the pivot connections 30 and 31 preferably allow free pivotal movement but movement of the deck 14 out of the horizontal plane could be achieved against a spring bias using any convenient form of spring such as a coil, tension, compression, leaf, torsion, or sprung wire. Alternatively, the same effect can be achieved by the use of an offset pivot arrangement where the respective pivots 30a, 30b are offset in a vertical plane.

Figure 8:
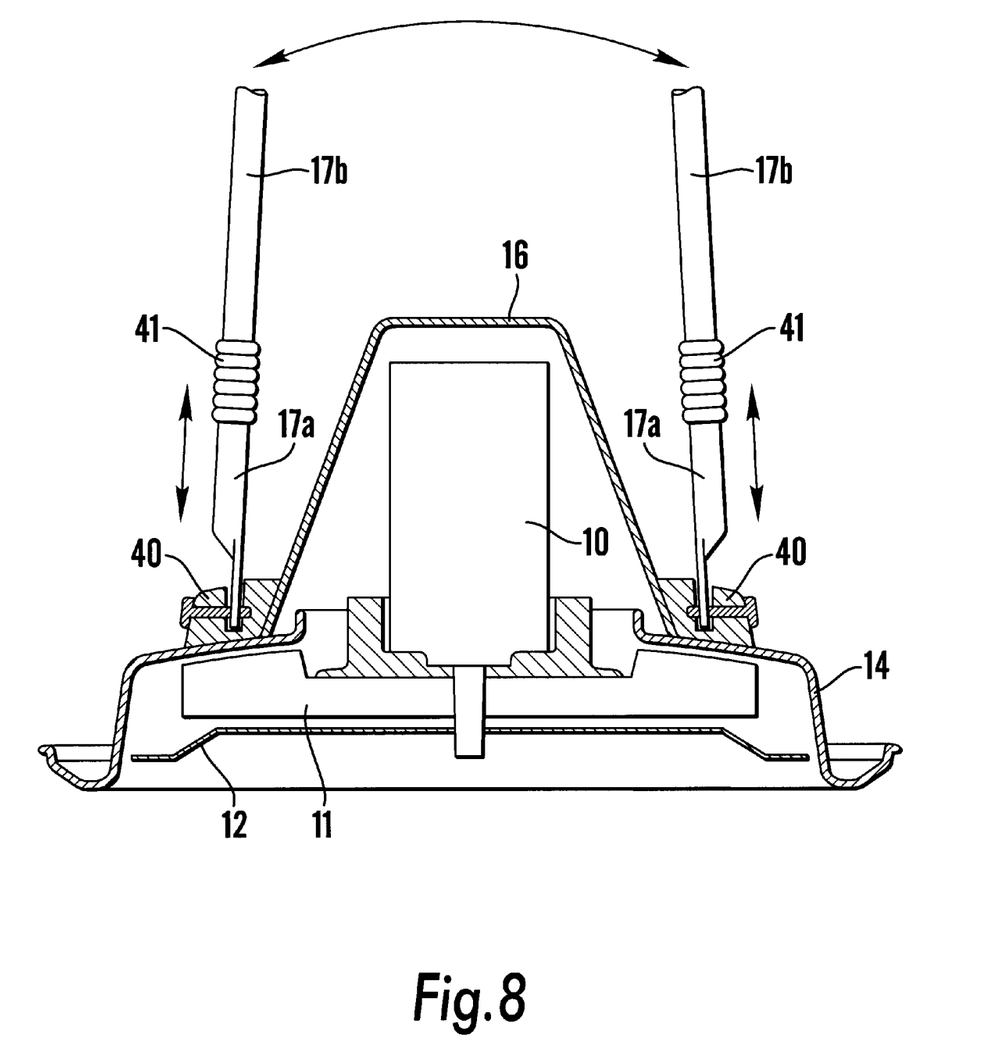
FIG. 8 is a schematic front view of a second hovermower embodying the invention.

Referring next to FIG. 8, the schematically illustrated hovermower is similar to that shown in FIGS. 1–7 but without the pivot connections 30a, 30b between the cover 16 and the deck 14. Like parts are denoted with like reference numerals.

In this example the hovermower includes a pram handle 17 having a lower section 17a pivotally mounted on a pair of brackets 40 secured to the deck 14, and an upper section 17b connected to the lower section by a resilient link 41.

As in the first example, the pivotal connection of the handle 17 at the brackets 40 allows the deck to tilt forwards and backwards about a horizontal axis relative to the handle 17 while the user is able to maintain the handle at a comfortable height. However, the tilting of the deck from side to side about a horizontal axis extending from front to rear of the mower is now achieved by the lower portion of the handle tilting relative to the upper portion of the handle through the resilient link 41. This is again achieved without the user having to apply any tilting effort through the handle.

The resilient link 41 will also act as a shock absorber by permitting limited movement of the upper section 17b of the handle toward and away from the lower section 17a.

Figure 9:
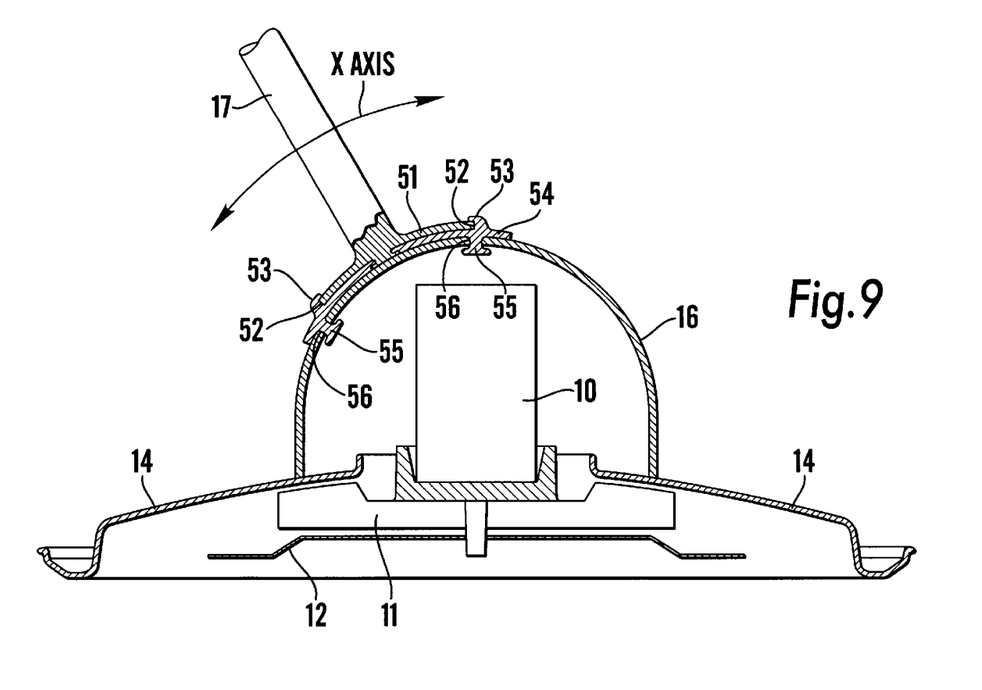
FIG. 9 is a schematic side view of a third hovermower embodying the invention.
Figure 10:
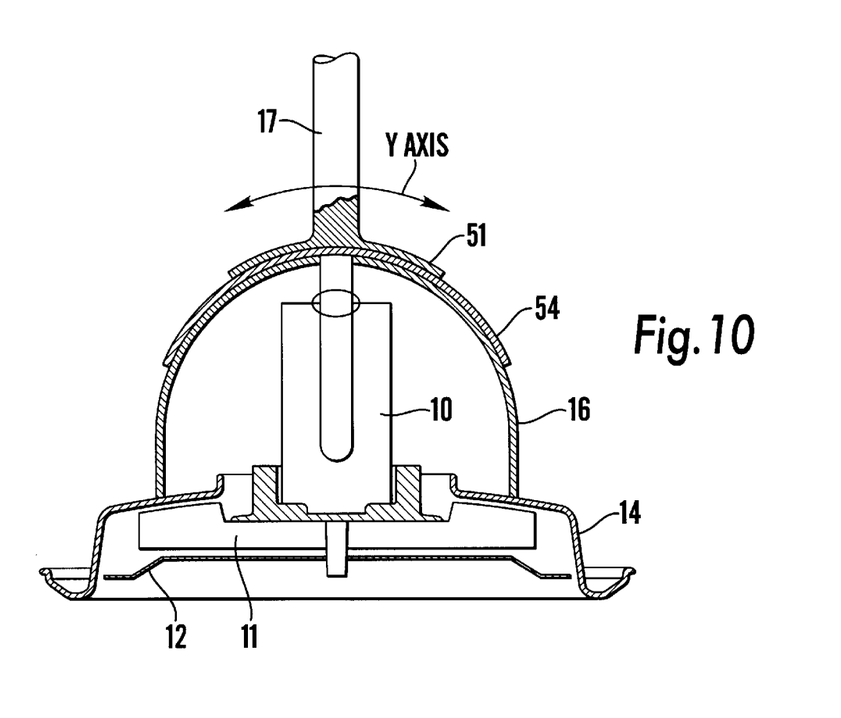
FIG. 10 is a schematic front view of the mower shown in FIG. 9.
Figure 11:
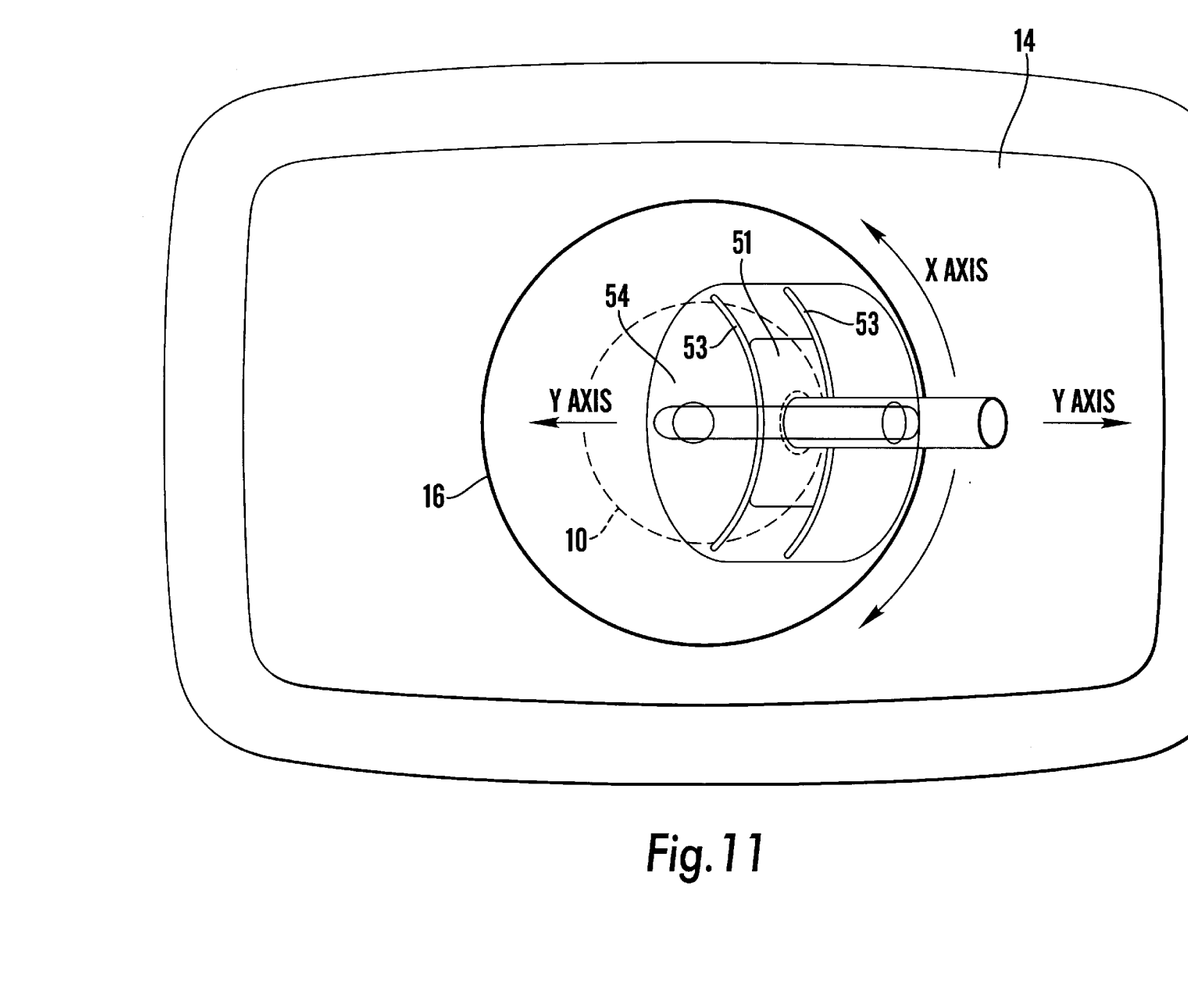
FIG. 11 is a schematic plan view of the mower shown in FIG. 9.

Referring next to FIGS. 9–11, the schematically illustrated hovermower is similar to that in the previous examples and like components are again denoted with like reference numerals.

In this example the pivot connections 30 and 31 are omitted and the handle 17 consists of a single steering arm which forms a ball joint with the cover 16. The steering arm thus terminates in a curved plate 51 which runs in a guide slot 52 formed by overhanging projections 53 of a curved guide plate 54 which in turn has projecting pegs 55 running in respective guide slots 56 formed in the curved wall of the cover 16. The pegs and guide slots are so arranged that the deck 14 is able to tilt about two mutually perpendicular horizontal axes relative to the handle 17, the sideways tilting movement being shown in FIG. 9 and the fore and aft tilting movement being shown in FIG. 10.

Although in the first described embodiment the first horizontal axis between the pivots 31a and 31b intersects the second horizontal axis at a point mid-way between the pivots 30a and 30b, it will be appreciated that in other embodiments the two axes may be in different horizontal planes and one axis may intersect the other at a point that does not lie between the two pivot points defining the other axis.

What is claimed is:

1. A hovermower comprising a motor for driving a cutter about a substantially vertical axis beneath a protective deck, means for generating a cushion of pressurised air beneath the deck, and a handle for maneuvring the deck over the ground, the deck being pivotable relative to the handle about a first substantially horizontal axis, characterised in that the deck is further pivotable relative to the handle about a second horizontal axis transverse to the first axis.

2. A hovermower according to claim 1 in which the deck is freely pivotable about the first and second axes.

3. A hovermower according to claim 1 in which the deck is pivotable against a resilient bias about the first axis.

4. A hovermower according to claim 1 wherein the handle is pivotally connected to a member bounding the motor, and the bounding member is pivotally connected to the deck.

5. A hovermower according to claim 4 wherein the bounding member is a cover shrouding the motor.

6. A hovermower according to claim 4 wherein the handle is a forked or pram handle having two forks pivotally connected to first diametrically opposed sections of the member bounding the motor for pivotal movement about the first horizontal axis, and wherein the deck is pivotally connected to second diametrically opposed sections of the bounding member for pivotal movement about the second horizontal axis, the first and second diametrically opposed sections being mutually perpendicular to one another.

7. A hovermower according to claim 4 wherein the handle is movable between an inclined operating position and an upright parked position, and wherein further retaining means prevent pivotal movement of the handle and the bounding member about the second horizontal axis when the handle is in its parked position.

8. A hovermower according to claim 7 wherein the handle is a forked or pram handle and the further retaining means comprise protuberances on the deck for engaging respective bottom surfaces of the handle forks when the handle is in its parked position.

9. A hovermower according to claim 1 wherein the handle is pivotally connected to a central swivel member to provide the relative pivotal movement about the first horizontal axis and the swivel member is pivotally connected to the deck to provide the relative pivotal movement about the second horizontal axis.

10. A hovermower according to claim 9 wherein the swivel member is circular and surrounds the motor.

11. A hovermower according to claim 10 wherein the swivel member comprises a cover shrouding the motor.

12. A hovermower according to claim 2 wherein the handle is pivotally connected to a member bounding the motor, and the bounding member is pivotally connected to the deck.

13. A hovermower according to claim 3 wherein the handle is pivotally connected to a member bounding the motor, and the bounding member is pivotally connected to the deck.

14. A hovermower according to claim 5 wherein the handle is a forked or pram handle having two forks pivotally connected to first diametrically opposed sections of the member bounding the motor for pivotal movement about the first horizontal axis, and wherein the deck is pivotally connected to second diametrically opposed sections of the bounding member for pivotal movement about the second horizontal axis, the first and second diametrically opposed sections being mutually perpendicular to one another.

15. A hovermower according to claim 5 wherein the handle is movable between an inclined operating position and an upright parked position, and wherein further retaining means prevent pivotal movement of the handle and the bounding member about the second horizontal axis when the handle is in its parked position.

16. A hovermower according to claim 6 wherein the handle is movable between an inclined operating position and an upright parked position, and wherein further retaining means prevent pivotal movement of the handle and the bounding member about the second horizontal axis when the handle is in its parked position.

17. A hovermower according to claim 2 wherein the handle is pivotally connected to a central swivel member to provide the relative pivotal movement about the first horizontal axis and the swivel member is pivotally connected to the deck to provide the relative pivotal movement about the second horizontal axis.

18. A hovermower according to claim 3 wherein the handle is pivotally connected to a central swivel member to provide the relative pivotal movement about the first horizontal axis and the swivel member is pivotally connected to the deck to provide the relative pivotal movement about the second horizontal axis.

19. A hovermower according to claim 1 in which the deck is pivotable against a resilient bias about the second axis.

20. A hovermower according to claim 1 in which the deck is pivotable against a resilient bias about the first and second axes.

21. A hovermower according to claim 1 wherein the handle is manually operable.

22. A walk-behind hovermower comprising a motor for driving a cutter about a substantially vertical axis beneath a protective deck, means for generating a cushion of air beneath the deck, and a manually operable handle for maneuvering the deck over the ground, the handle being pivotally connected to a central swivel member for pivotal movement about a first substantially axis, and the swivel member being pivotally connected to the deck for pivotal movement about a second substantially horizontal axis transverse to the first axis.

23. A walk-behind hovermower according to claim 22 wherein the swivel member comprises a member shrouding the motor.

* * * * *